(12) United States Patent
Huckaby et al.

(10) Patent No.: US 11,454,748 B2
(45) Date of Patent: Sep. 27, 2022

(54) LOW SPARKLE ARTICLES AND DISPLAY SYSTEM STACKS

(71) Applicant: Europtec USA, Inc., Clarksburg, WV (US)

(72) Inventors: Darren K. Huckaby, Morgantown, WV (US); Andreas Ruefenacht, Canonsburg, PA (US); Eric S. Miller, Shinnston, WV (US); David L. Soberanis, Bozeman, MT (US)

(73) Assignee: Europtec USA, Inc., Clarksburg, WV (US)

( * ) Notice: Subject to any disclaimer, the term of this patent is extended or adjusted under 35 U.S.C. 154(b) by 448 days.

(21) Appl. No.: 16/680,905

(22) Filed: Nov. 12, 2019

(65) Prior Publication Data

US 2020/0150317 A1 May 14, 2020

Related U.S. Application Data

(60) Provisional application No. 62/760,447, filed on Nov. 13, 2018.

(51) Int. Cl.
*G02B 5/02* (2006.01)
*G02F 1/1333* (2006.01)
*G02F 1/1335* (2006.01)

(52) U.S. Cl.
CPC ......... *G02B 5/0221* (2013.01); *G02B 5/0278* (2013.01); *G02F 1/133308* (2013.01); *G02F 1/133502* (2013.01); *G02F 1/133331* (2021.01)

(58) Field of Classification Search
CPC ......... G02F 1/133331; G02F 1/133502; G02F 1/133504; G02B 5/0221; G02B 5/0226; G02B 5/0294
See application file for complete search history.

(56) References Cited

U.S. PATENT DOCUMENTS

| 7,783,130 | B2 | 8/2010 | Watson |
| 8,139,892 | B2 | 3/2012 | Watson |
| 2012/0218640 | A1* | 8/2012 | Gollier .................. C03C 15/00 |
| | | | 359/601 |
| 2017/0131559 | A1 | 5/2017 | Sitter et al. |
| 2018/0095197 | A1* | 4/2018 | Dillon ...................... B05D 1/02 |
| 2020/0166677 | A1* | 5/2020 | Sugawara ................ G09F 9/00 |

(Continued)

OTHER PUBLICATIONS

ASTM International Designation: D523-14: "Standard Test Method for Specular Gloss" (5 pages) (Reapproved 2018).

(Continued)

*Primary Examiner* — Angela K Davison
(74) *Attorney, Agent, or Firm* — Myers Bigel, P.A.

(57) ABSTRACT

The present invention describes articles comprising a substrate including opposed front and back surfaces, wherein the front surface and the back surface each comprise surface structures that are randomly oriented on each surface, wherein the front surface and the back surface each have a surface roughness and a gloss value, and wherein the surface roughness of the front surface does not equal the surface roughness of the back surface and/or the gloss value of the front surface does not equal the gloss value of the back surface. Display system stacks utilizing the described articles are also provided.

20 Claims, 11 Drawing Sheets
(3 of 11 Drawing Sheet(s) Filed in Color)

(56) References Cited

U.S. PATENT DOCUMENTS

2021/0163344 A1* 6/2021 Sinapi .................. G02B 5/0278

OTHER PUBLICATIONS

ISO International Standard 4287: "Geometrical Product Specifications (GPS)—Surface texture: Profile method—Terms, definitions and surface texture parameters" (36 pages) (first edition, Apr. 1, 1997).

ISO International Standard 4287: "Geometrical Product Specifications (GPS)—Surface texture: Profile method—Terms, definitions and surface texture parameters" (6 pages) (Amendment 1, Jun. 15, 2009).

* cited by examiner

LOW SPARKLE ARTICLES AND DISPLAY SYSTEM STACKS

RELATED APPLICATION(S)

The present application claims priority from and the benefit of U.S. Provisional Application Ser. No. 62/760,447, filed Nov. 13, 2018, the disclosure of which is hereby incorporated herein in its entirety.

FIELD

The present application is directed generally to articles and display system stacks that can reduce or eliminate sparkle when used in front of high pixel density electronic displays.

BACKGROUND

High-resolution displays with pixel densities that are greater than 100 pixels per inch (PPI) tend to create an interference pattern that appears to "sparkle" to the human eye when an anti-glare glass is placed in front of the display. Anti-glare glass has a micro-etched surface that creates a "matte" finish, which breaks up reflected images so that the person can focus on the image of the display and not the reflected image. Sparkle can be the result of the interaction between two structured layers: the regular pixel matrix of a display and the random surface structure of an anti-glare layer. Sparkle usually becomes obvious as a twinkling or glittering overlay of the image presented on display screens with scattering anti-glare cover layers, it becomes particularly distinct when the head of the observer is moving with respect to the display. Some computer users even complain about focusing problems and eye-strain caused by such visual sparkling.

SUMMARY

A first aspect of the present invention is directed to an article comprising a substrate including opposed front and back surfaces, wherein the front surface and the back surface each comprise surface structures that are randomly oriented on each surface, wherein the front surface and the back surface each have a surface roughness and a gloss value, and wherein the surface roughness of the front surface does not equal the surface roughness of the back surface and/or the gloss value of the front surface does not equal the gloss value of the back surface.

Another aspect of the present invention is directed to a display system stack, comprising a display and an article comprising a substrate including opposed front surface and back surfaces, wherein the front surface and the back surface each comprise surface structures that are randomly oriented on each surface, wherein the front surface and the back surface each have a surface roughness and a gloss value, and wherein the surface roughness of the front surface does not equal the surface roughness of the back surface and/or the gloss value of the front surface does not equal the gloss value of the back surface, wherein the display is configured to emit light through the article.

Another aspect of the present invention is directed to an article comprising a substrate having two or more layers, wherein each layer of the substrate comprises a front surface and a back surface, wherein at least two surfaces of the two or more layers comprise surface structures that are randomly oriented on each of the surfaces and at least one of die at least two surfaces is an internal surface of the substrate, wherein the at least two surfaces each have a surface roughness and/or a gloss value, and wherein the surface roughness of at least one of the at least two surfaces does not equal the surface roughness of a different at least one of the at least two surfaces and/or the gloss value of at least one of the at least two surfaces does not equal the gloss value of a different at least one of the at least two surfaces It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

Figure 1:
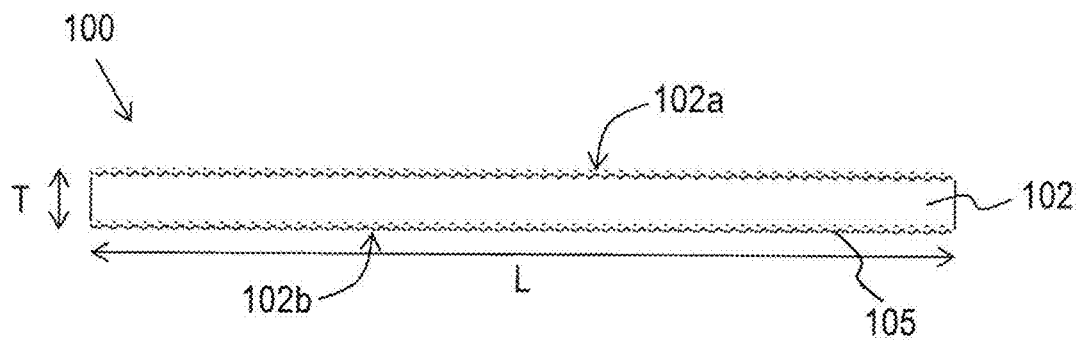
FIG. 1 illustrates an exemplary article according to embodiments of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention now will be described more fully hereinafter with reference to the accompanying drawings, in which illustrative embodiments of the invention are shown. Like numbers refer to like elements and different embodiments of like elements can be designated using a different number of superscript indicator apostrophes (e.g., 10, 10', 10").

In the figures, certain layers, components or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X Y" mean "from about X to about Y."

As used herein, the term "anti-glare" refers to a property of a substrate, such as a glass or plastic sheet, in which light reflected from a surface of the substrate is changed into a diffuse reflection rather than a specular reflection. The anti-glare property does not reduce the global amount of light reflected from the surface, but changes the characteristics of the reflected light.

As used herein, the term "sparkle" refers to small bright spot(s) (approximately at the pixel size scale) that can randomly appear in the instant texture of an image of a display which to the human eye may give a grainy appearance to the transmitted image. The spots may change location, intensity, and/or color based on the viewing direction. Sparkle usually becomes obvious as a twinkling or glittering overlay of the image presented on display screens with scattering anti-glare cover layers, it becomes particularly distinct when the head of the observer is moving with respect to the display.

Embodiments of the present invention are directed to articles, which may greatly reduce or eliminate sparkle when used in front of a display (e.g., high pixel density display screens). As used herein, the term "display" includes, but is not limited to, display systems and display screens. In some embodiments, an article of the present invention is an anti-glare article. An article of the present invention comprises a substrate. The substrate may be a single unitary layer or may comprise multiple layers (e.g., 2, 3, 4 or more layers). In some embodiments, a layer of a substrate may be a coating, film, glass, or plastic. In some embodiments, a substrate may comprise at least one glass or plastic layer and optionally a coating and/or film layer. In some embodiments, the coating and/or film layer may be used to induce the change in refractive index. The substrate comprises a front surface and a back surface that oppose each other. The front and back surfaces of the substrate may comprise surface structures. The surface structures on the front surface may be different than the surface structures on the back surface, such as, for example, in size, number, orientation, texture, etc. The surface structures may be randomly oriented on a surface of the substrate (e.g., the front and/or back surfaces). The front and back surfaces of the substrate may have a surface roughness and a gloss value. In some embodiments, the surface roughness of the front surface does not equal the surface roughness of the back surface. In some embodiments, the gloss value of the front surface does not equal the gloss value of the back surface. In some embodiments, the article may have at least one internal roughened surface and/or at least one internal surface including surface structures, for example, when the substrate of the article comprises multiple layers. Thus, the front surface and/or back surface of an article of the present invention may be an internal surface of the article. Articles of the present invention may be used in combination with a display, such as, for example, a high-resolution display screen. The article may be optically bonded to the display or there may be an air gap between the article and the display.

Referring now to the figures, an article 100 according to embodiments of the present invention is illustrated in FIG. 1. Referring to FIG. 1, the article 100 may comprise a substrate 102 having opposed front and back surfaces 102a, 102b. The front surface 102a and back surface 102b may each comprise surface structures 105 that are randomly oriented on each surface 102a, 102b) (see also, e.g., FIGS. 7A-7B and FIGS. 8A-8B) and may provide the front surface 102a with a different surface roughness and/or gloss value than the back surface 102b. In some embodiments, the substrate 102 comprises a single unitary layer (see, FIG. 1). In some embodiments, the article 100 is an etched article and/or an anti-glare article.

The front surface 102a and the back surface 102b of the substrate 102 each have a surface roughness. As used, herein, "surface roughness" refers to the surface texture of a substrate quantified by the deviations in the direction of the normal vector on the substrate's surface from its ideal form. These deviations (e.g., surface structures 105) may include bumps and/or cavities, commonly referred to as "peaks" and "valleys," respectively.

Surface roughness may be measured using methods known in the art. In some embodiments, the surface roughness of the front and back surfaces 102a, 102b may be measured pursuant to standard EN ISO 4287-1997. Surface roughness is typically characterized by the Ra, Rz and Rq values (expressed in microns) defined in the standard EN ISO 4287-1997. Ra (amplitude value or average roughness) corresponds to the average difference of texture of a surface, i.e., the average arithmetic average of absolute values of differences between the peaks and valleys and gives an indication of the height of the deviations on a surface (e.g., the front and back surfaces 102a, 102b of the substrate 102). For example, the larger the Ra value (i.e., the deviations) of a surface (front 102a and/or back 102b), the rougher the surface. Rz is an alternative measurement for surface roughness and corresponds to the maximum height of profile of a surface (e.g., front and back surfaces 102a, 102b). Rq (sometimes also referred to as RMS) is another alternative measurement for surface roughness and measures the root-mean-square deviation of a surface profile (e. g., a surface profile for front and back surfaces 102a, 102b).

In some embodiments, the surface roughness of the front surface 102a does not equal the surface roughness of the back surface 102b. In some embodiments, the surface roughness of the front and/or back surfaces 102a, 102b may be in a range of about 0.01 µm to about 1 µm, such as, for example, the surface roughness of the front and/or back surfaces 102a, 102b may be about 0.01 µm, 0.1 µm, 0.2 µm, 0.3 µm, or 0.4 µm to about 0.5 µm, 0.6 µm, 0.7 µm, 0.8 µm, 0.9 µm, or 1 µm.

In some embodiments, the surface roughness (Ra) for the front and/or back surfaces 102a, 102b of the article 100 is less than 1 µm and the maximum peak to valley is less than 4 µm. For example, the maximum peak to valley of the front and/or back surfaces 102a, 102b may be about 0.1 µm, 0.5 µm, 1 µm, 1.5 µm, 2 µm, 2.5 µm, 3 µm, 3.5 µm, or 3.9 µm. In some embodiments, the front and/or back surfaces 102a, 102b have greater than 4 peaks per 100 µm. For example, in some embodiments, the front and/or back surfaces 102a, 102b have greater than 4 peaks, 10 peaks, 20 peaks, or 30 peaks per 100 µm. In some embodiments, the front and/or back surfaces 102a, 102b have about 4 peaks, 10 peaks, 15 peaks, or 20 peaks per 100 µm to about 25 peaks, 30 peaks, 35 peaks, or 40 peaks per 100 µm.

In some embodiments, the surface roughness of the back surface 102b of the substrate 102 is greater than the surface roughness of the front surface 102a of the substrate 102. For example, in some embodiments, the back surface 102b of the substrate 102 is rougher than the front surface 102a of the substrate 102 (i.e., the back surface 102b has larger deviations than the front surface 102a). In some embodiments, the back surface 102b of the substrate 102 has a greater surface roughness than the front surface 102a of the substrate 102 at a ratio in a range of about 1.3:1 to about 15:1, such as, for example, at a ratio of about 1.3:1, 2:1, 3:1, 4:1, or 5:1 to about 6:1, 7:1, 8:1, 9:1,10:1, or 15:1 (surface roughness of back surface 102b: surface roughness of front surface 102a).

The front surface 102a and the back surface 102b of the substrate 102 each have a gloss value. As used herein, the term "gloss value" refers to the capacity of a surface to reflect more light in directions close to the specular than in others and correlates with visual observations of surface shininess made at roughly the corresponding angles. Gloss value may be characterized by the gloss ratings defined in ASTM Standard D523-14 (2018). In some embodiments, the gloss value of the front surface 102a does not equal the gloss value of the back surface 102b. In some embodiments, the gloss value of the front and/or back surface 102a, 102b may be in a range of about 1.5 gloss units (GU) to about 140 GU, optionally when measured at 60 degrees. For example, the gloss value may be in a range of about 1.5 GU, 10 GU, 20 GU, 30 GU, 40 GU, 50 GU, 60 GU, or 70 GU to about 80 GU, 90 GU, 100 GU, 110 GU, 120 GU, 130 GU, or 140 GU, optionally when measured at 60 degrees. Gloss value may be measured using methods known in the art. In some embodiments, the gloss value of the front and back surfaces 102a, 102b may be measured pursuant to ASTM Standard D523-14.

In some embodiments, the surface roughness of the front surface 102a of the substrate 102 does not equal the surface roughness of the back surface 102b of the substrate 102 and/or the gloss value of the front surface 102a of the substrate 102 does not equal the gloss value of the back surface 102b of the substrate 102.

In some embodiments, the substrate 102 of the article 100 may have a thickness (T) in the range of about 0.05 mm to about 12 mm. For example, the substrate 102 may have a thickness in the range of about 0.05 mm, 0.1 mm, 1 mm, 2 mm, 3 mm, 4 mm, 5 mm or 6 mm to about 7 mm, 8 mm, 9 mm, 10 mm, 11 mm or 12 mm. In some embodiments, the substrate 102 is transparent. In some embodiments, the substrate 102 may comprise glass and/or plastic. The substrate 102 may comprise glass whose matrix composition is not particularly limited. For example, in some embodiments, the substrate 102 may comprise soda-lime glass, aluminosilicate glass, and/or borosilicate glass.

Figure 2:
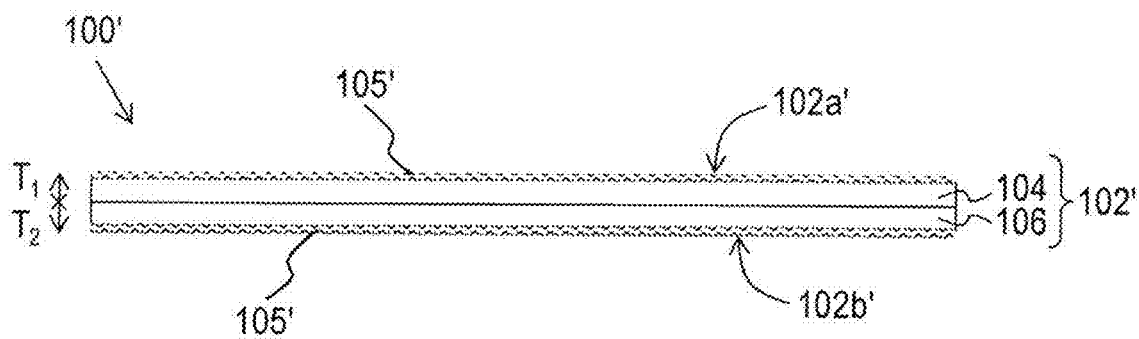
FIG. 2 illustrates an exemplary article according to embodiments of the present invention.

Referring to FIG. 2, in some embodiments, a substrate 102' of the article 100' may comprise a plurality of layers 104, 106. For example, in some embodiments, the substrate 102' may comprise 2, 3, 4 or more layers. As shown in FIG. 2, in some embodiments, the substrate 102' may comprise a first layer 104 and a second layer 106. The first and second layers 104, 106 may be stacked. In some embodiments, the first and second layers 104, 106 are stacked so that the layers 104, 106 are in contact with each other. In some embodiments, the first layer 104 may comprise the front surface 102a" and the second layer 106 may comprise the back surface 102b', each including surface structures 105'.

In some embodiments, the first and second layers 104, 106 of the substrate 102' may be optically bonded together. In some embodiments, the first and second layers 104, 106 may be optically bonded together with an optically clear adhesive. In some embodiments, the optically clear adhesive has an index of refraction that matches the index of refraction of one or more of the layers 104, 106 of the substrate 102'. For example, in embodiments where the layers 104, 106 of the substrate 102' comprise glass, the optically clear adhesive has an index of refraction of approximately 1.5.

Properties and/or features of the article 100', substrate 102', and surfaces 102a', 102b', such as, for example, thickness, surface roughness, and gloss value, may be as described above in reference to FIG. 1 and duplicate discussion thereof may be omitted herein for the purposes of discussing FIG. 2.

In some embodiments, the first layer 104 has a thickness ($T_1$) in the range of about 0.05 mm to about 12 mm with the substrate 102' having a thickness of about 0.1 mm to about 12 mm. In some embodiments, the second layer 106 has a thickness ($T_2$) in the range of about 0.05 mm to about 12 mm with the substrate 102' having a thickness of about 0.1 mm to about 12 mm.

Figure 3:
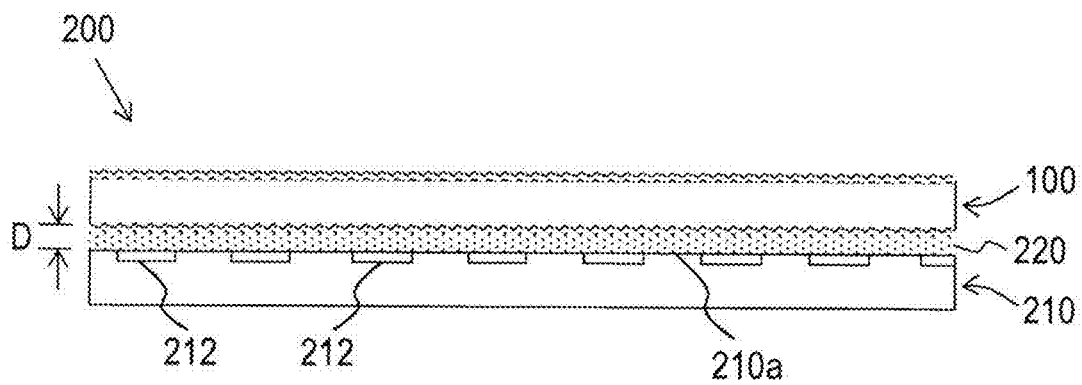
FIG. 3 illustrates an exemplary display stack system with the article of FIG. 1 according to embodiments of the present invention.
Figure 4:
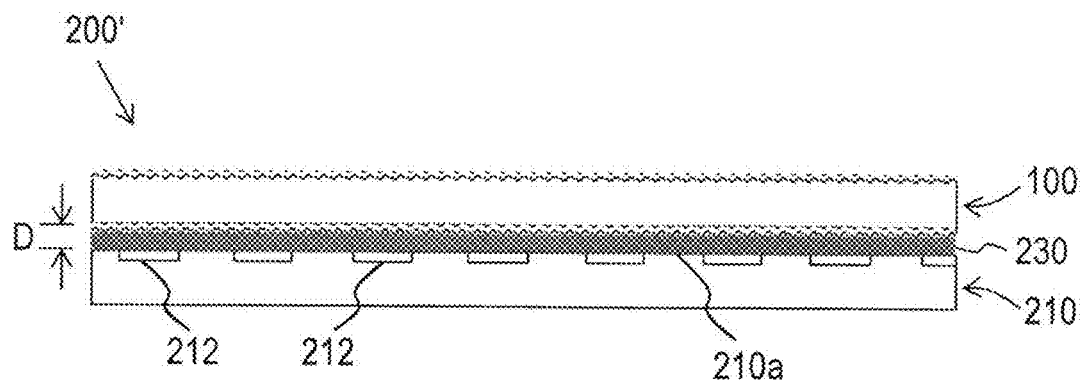
FIG. 4 illustrates an exemplary display stack system with the article of FIG. 1 according to embodiments of the present invention.

Referring now to FIGS. 3 and 4, a display system stack 200, 200' according to embodiments of the present invention is illustrated. As shown in FIGS. 3 and 4, the display system stack 200 may comprise a display 210 and an article 100 as described above. In some embodiments, the distance (D) between the display 210 and the article 100, may be in a range of about 0 mm to about 10 mm. For example, the distance (D) between the display 210 and the article 100 may be in a range of about 0 mm, 0.5 mm, 1 mm, 1.5 mm, 2 mm, or 2.5 mm to about 3 mm, 3.5 mm, 4 mm, 4.5 mm, 5 mm, 5.5 mm, 6 mm, 6.5 mm, 7 mm, 7.5 mm, 8 mm, 8.5 mm, 9 mm, 9.5 mm, or 10 mm. The display 210 may be configured to emit light through the article 100.

In some embodiments, the display 210 is a high-resolution display. High-resolution displays have a number of pixels 212 per inch (PPI). In some embodiments, the display 210 is a high-resolution display having greater than 70 PPI, such as, for example, greater than about 70PPI, 80 PPI, 90 PPI, 100 PPI, 110 PPI, 120 PPI, 130 PPI, 140 PPI, 150 PPI, 200 PPI, 250 PPI, or 300 PPI. As shown in FIG. 3, in some embodiments, the display system stack 200 may further comprise an air gap 220 between a front surface 210a of the display 210 and the article 100.

Referring to FIG. 4, in some embodiments, the display system stack 200' may further comprise a bonding material 230 that is between the article 100 and the display 210 and bonds the article 100 and the display 210 together. In some embodiments, the bonding material 230 is an optical bonding material 230. In some embodiments, the bonding material 230 is an optically clear adhesive. In some embodiments, the bonding material 230 may have a different refractive index than the article 100. For example, in some embodiments, the bonding material 230 may have a refractive index that is greater than 1.5. In some embodiments, the bonding material 230 may have a refractive index that is less than 1.5. Exemplary types of bonding material 230 include, but are not limited to, acrylics, silicones, polyvinyl butyral (PVB), mineral oil, silicon oil, and/or urethanes. In some embodiments, a display system stack does not utilize a bonding material between the article and the display and/or is devoid of a bonding material.

Figure 5:
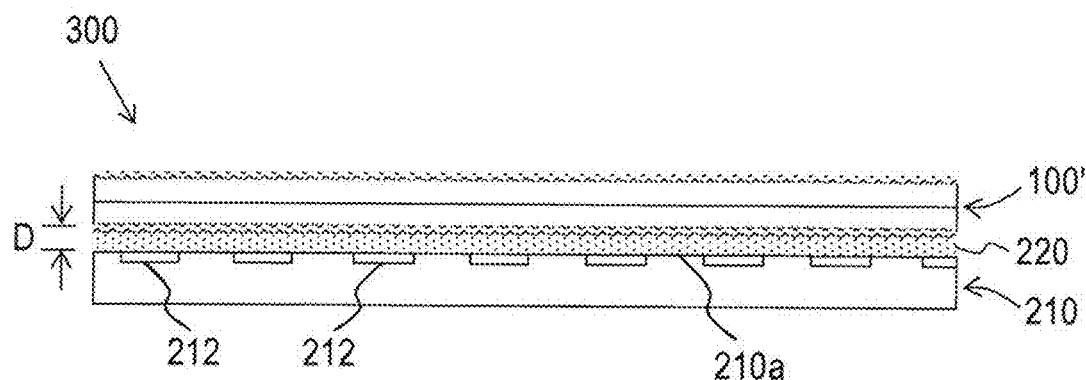
FIG. 5 illustrates an exemplary display stack system with the article of FIG. 2 according to embodiments of the present invention.
Figure 6:
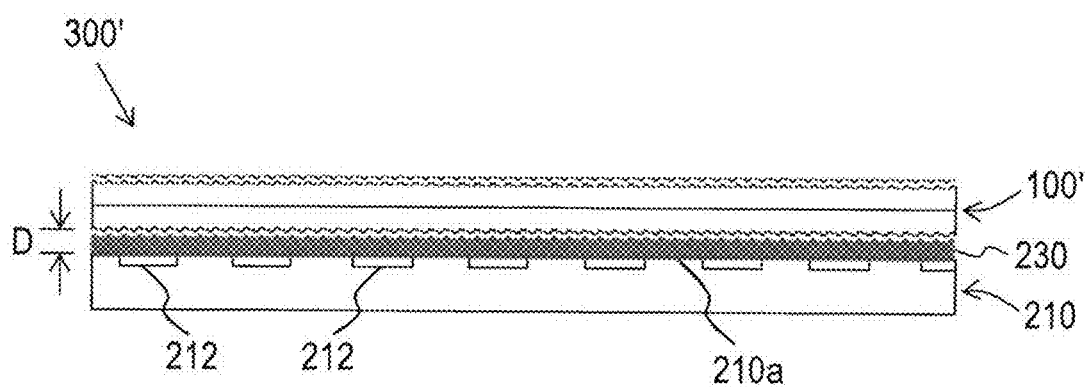
FIG. 6 illustrates an exemplary display stack system with the article of FIG. 2 according to embodiments of the present invention.
Figure 7A:
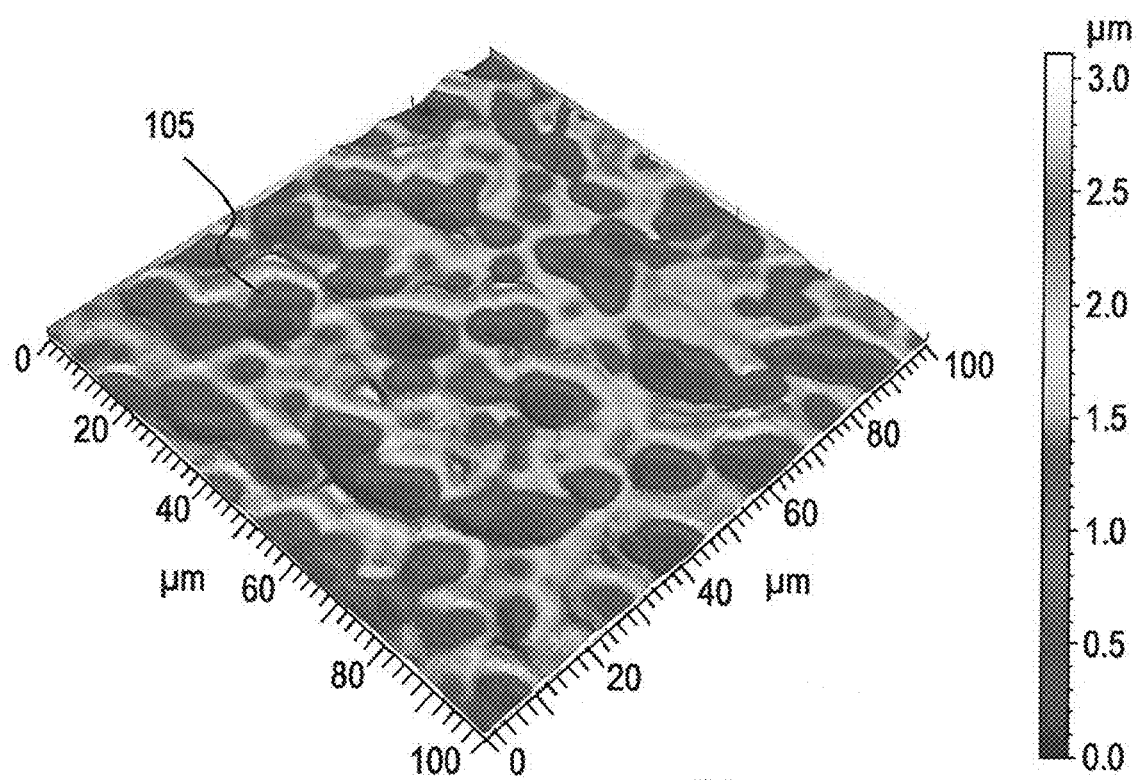
FIG. 7A is a microscopic color image of a surface of an exemplary article with 35 gloss measured at 60 degrees according to embodiments of the present invention with all axes (X, Y, Z) scaled 1:1.
Figure 7B:
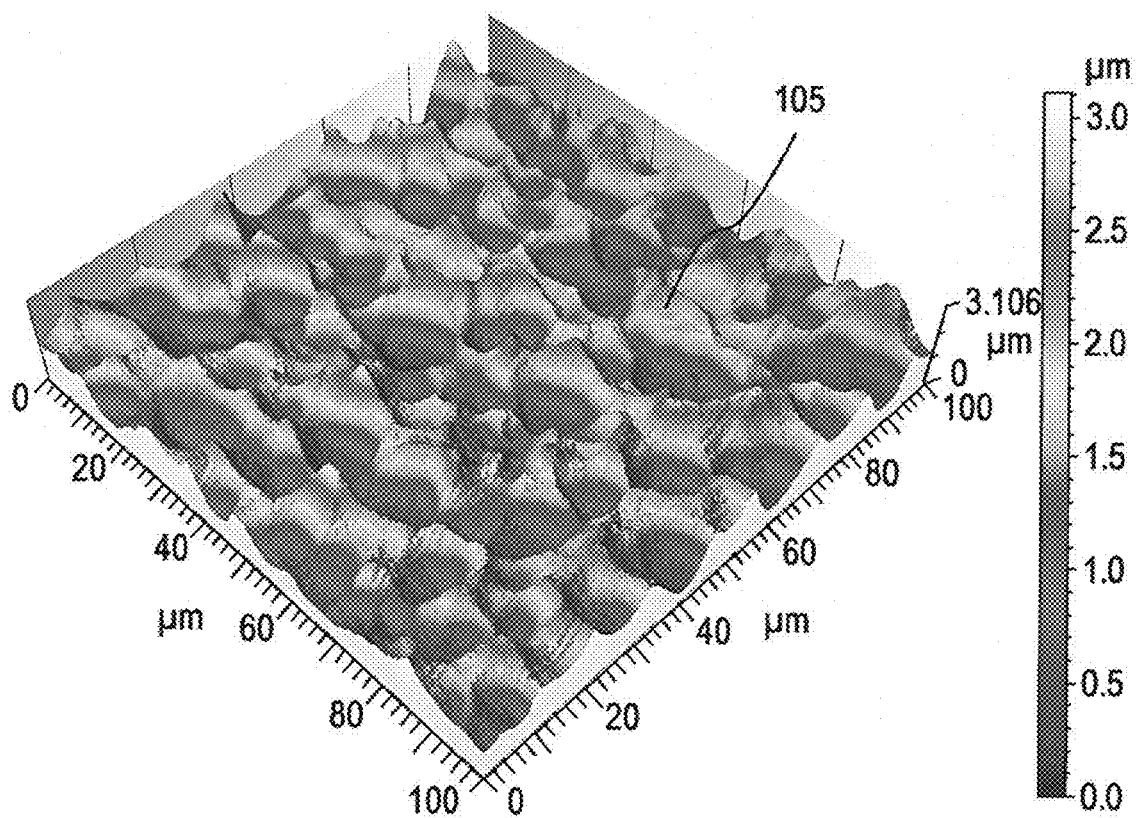
FIG. 7B is the microscopic color image of FIG. 7A with the Z axis optimized.
Figure 8A:
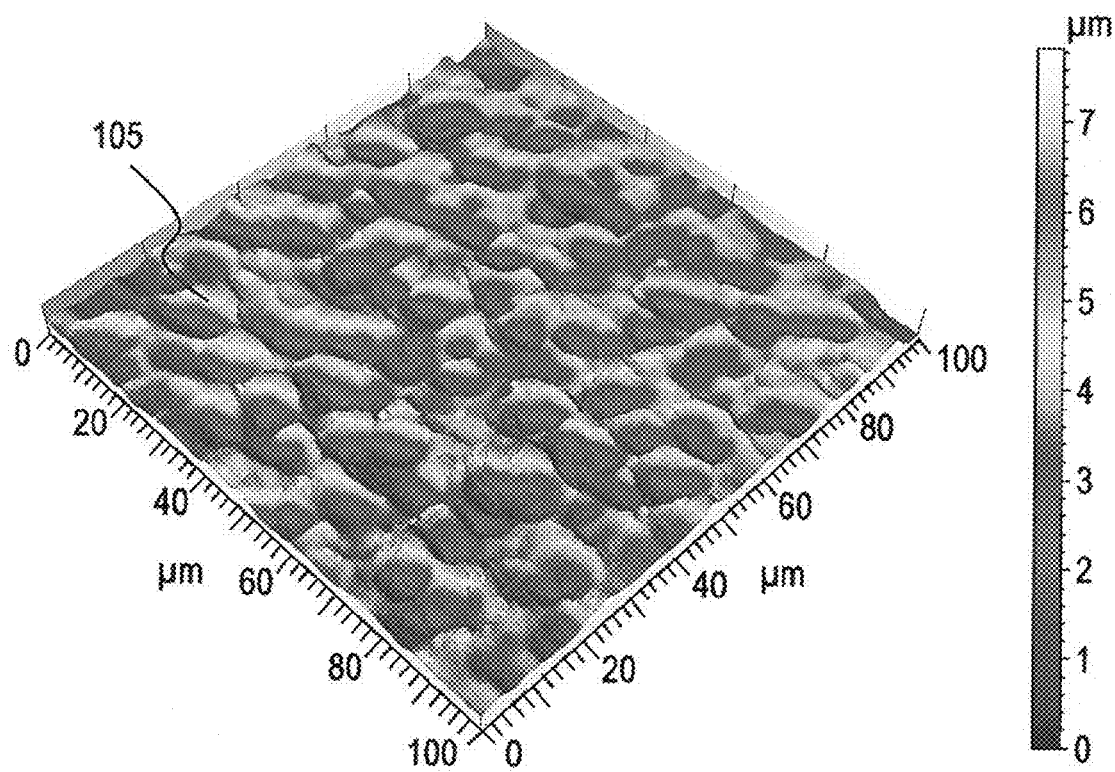
FIG. 8A is a microscopic color image of a surface of an exemplary article with 70 gloss measured at 60 degrees according to embodiments of the present invention with all axes (X, Y, Z) scaled 1:1.
Figure 8B:
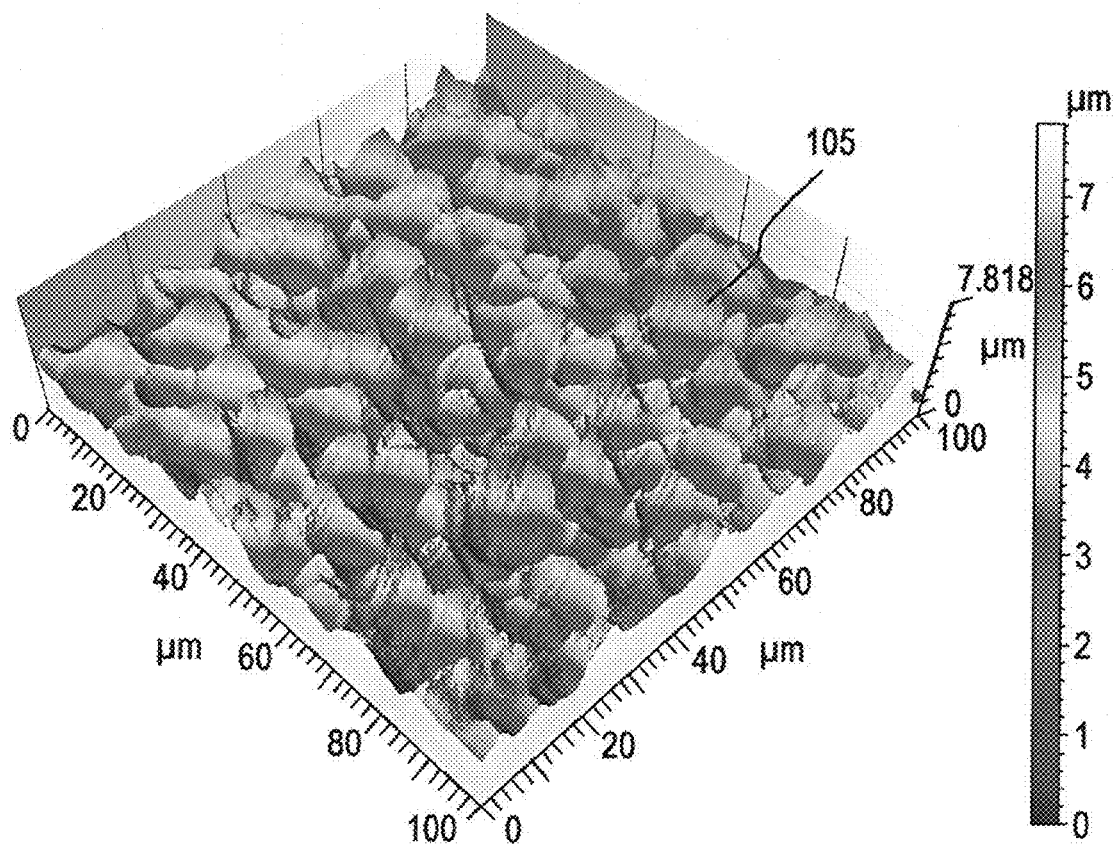
FIG. 8B is the microscopic color image of FIG. 8A with the Z axis optimized.

Referring now to FIGS. 5 and 6, a display system stack 300, 300' according to embodiments of the present invention is illustrated. As shown in FIGS. 5 and 6, the, display system stack 300, 300' may comprise a display 210 and an article 100' as described above. Properties and/or features of the display system stack 300, 300' may be as described above in reference to FIGS. 3 and 4 and duplicate discussion thereof may be omitted herein for the purposes of discussing FIGS. 5 and 6.

As described above, in some embodiments, the substrate of an article of the present invention may comprise multiple layers. As illustrated in FIGS. 9A-9D, in some embodiments, the front surface and/or back surface of a layer of the substrate may include surface structures as described herein and/or have a surface roughness and/or gloss value different than another surface. In some embodiments, when the layers of the substrate are stacked on top of each other, the resultant multi-layered substrate of an article of the present invention may have one or more internal surfaces that include surface structures as described herein. Please note that the figures are for illustrative purposes only. A person of ordinary skill in the art would understand that when the layers are stacked on top of each other, the layers may directly contact each other, there may be an optically bonded non-index matched material between the layers and/or there may a gap between the layers.

Properties and/or features of the articles, substrates, and surfaces, such as, for example, thickness, surface roughness, and gloss value, may be as described above in reference to FIGS. 1-2 and duplicate discussion thereof may be omitted herein for the purposes of discussing FIGS. 9A-9D. In some embodiments, an article of the present invention may comprise two or more (e.g., 2, 3, 4, 5, 6, 7, 8, or more) surfaces that include surface structures and the two or more surfaces may be internal surfaces. In some embodiments, an article of the present invention may comprise one or more (e.g., 1, 2, 3, 4, 5, 6, 7, 8, or more) internal surfaces including surface structures.

Figure 9A:
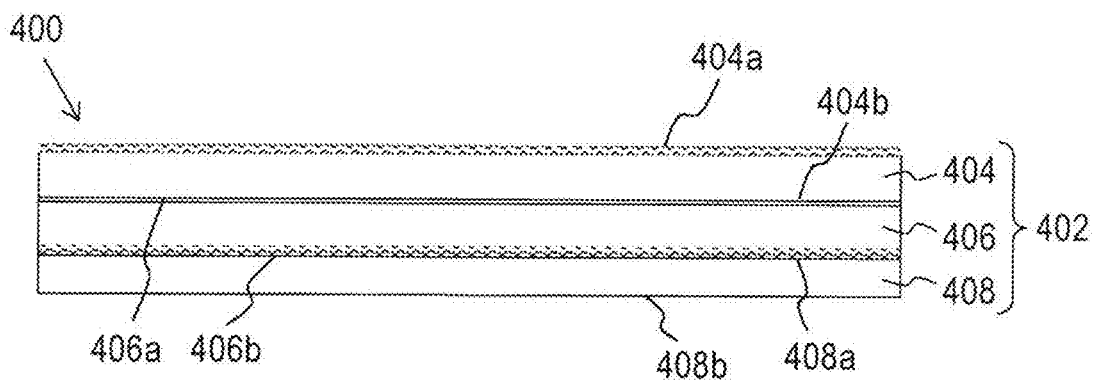
FIG. 9A illustrates an exemplary article according to embodiments of the present invention.

For example, referring to FIG. 9A, in some embodiments, an article 400 comprises a substrate 402. The substrate 402 may comprise a front layer 404, a second layer 406, and a third layer 408. Each layer 404, 406, 408 may have a front surface 404a, 406a, 408a and a back surface 404b, 406b, 408b. Like described above, the front surface 404a, 406a, 408a and/or back surface 404b, 406b, 408b of each layer 404, 406, 408 may each comprise surface structures 105 that are randomly oriented on each surface 404a,b, 406a,b, 408a,b (see, e.g., FIGS. 7A-7B and FIGS. 8A-8B). One or more of the surfaces 404a,b, 406a,b, 408a,b may have a different surface roughness and/or gloss value than another surface of the article 400.

As shown in FIG. 9A, the front surface 404a of the first layer 404 and the back surface 408b of the third layer 408 form the outer surfaces of article 400. In some embodiments, the first layer 404 of substrate 402 may have a front surface 404a with surface structures. One or more of the remaining surfaces may also include surface structures and have a different surface roughness and/or gloss value than 404a. For example, the second layer 406 of substrate 402 may have a back surface 406b with surface structures and have a different surface roughness and/or gloss value than the front surface 404a of the first layer 404. The back surface 406b of the second layer 406 is an internal surface of the article 400 (i.e., not an outer surface 404a, 408b of article 400).

Figure 9B:
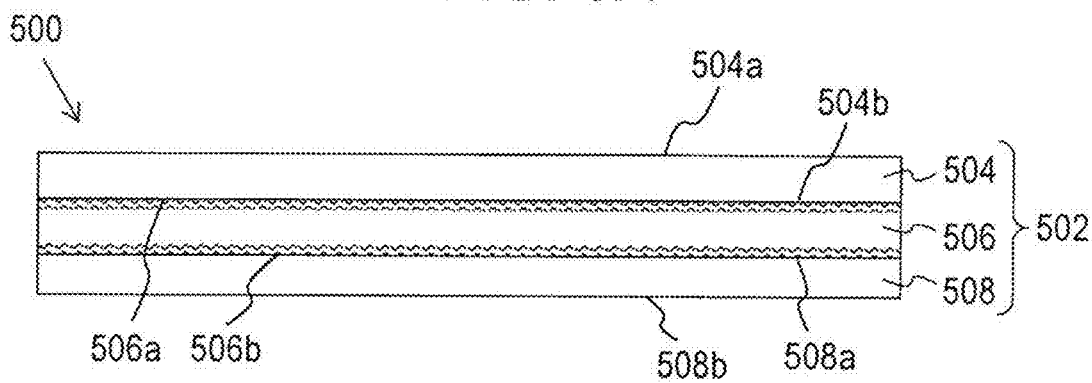
FIG. 9B illustrates an exemplary article according to embodiments of the present invention.

Referring to FIG. 9B, in some embodiments, a second layer 506 of a substrate 502 is an internal layer having a front surface 506a and back surface 506b. Each surface 506a, 506b may include surface structures and the front surface 506a may have a different surface roughness and/or gloss value than the back surface 506b. In some embodiments, both the front and back surfaces 506a, 506b of the second layer 506 may be roughened internal surfaces of the article 500.

Figure 9C:
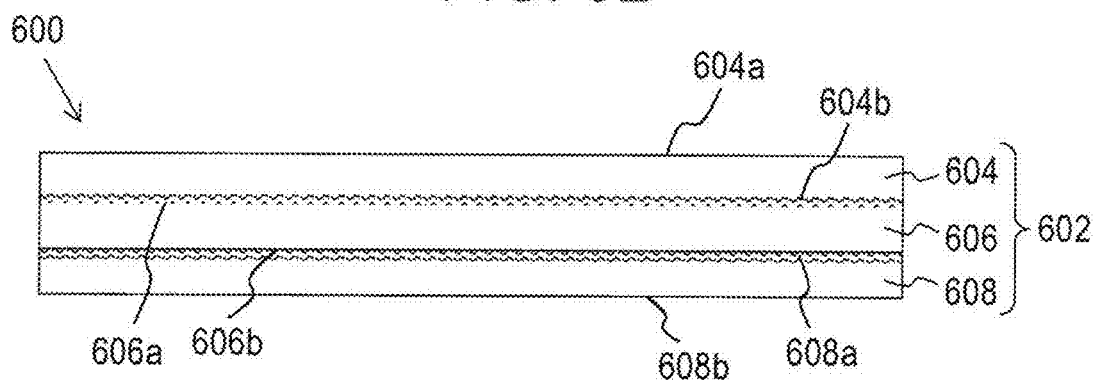
FIG. 9C illustrates an exemplary article according to embodiments of the present invention.

Referring to FIG. 9C, in some embodiments, a back surface 604b of a first layer 604 of a substrate 602 includes surface structures and a front surface 608a of a third layer 608 includes surface structures such that the surface roughness and/or gloss value of the front surface 608a is different than the surface roughness and/or gloss value of the back surface 604b of the first layer 604 of the substrate 602. In some embodiments, the back surface 604b of the first layer 604 and the front surface 608a of the third layer 608 may be roughened internal surfaces of article 600.

Figure 9D:
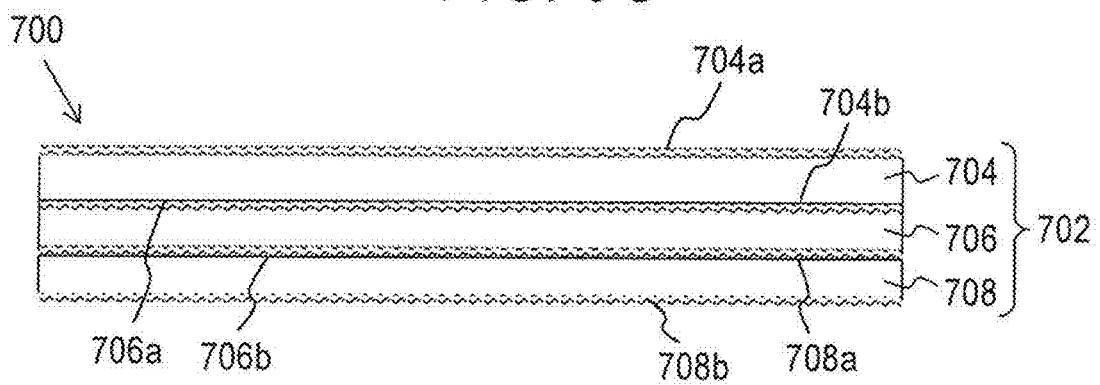
FIG. 9D illustrates an exemplary article according to embodiments of the present invention.

Referring to FIG. 9C, in some embodiments, front surfaces 704a, 706a of first and second layers 704, 706 of a substrate 702 and back surfaces 706b, 708b of second and third layers 706, 708 the substrate 702 include surface structures. Two or more surfaces 704a, 706a, 706b, and/or 708a can have a different surface roughness and/or gloss value. As shown in FIG. 9D, the front and back surfaces 706a, 706b of the second layer 706 are internal surfaces of article 700.

In some embodiments, an article of the present invention (e.g., article 100, 100') uniformly disperses light. In some embodiments, an article of the present invention has a sparkle contrast in a range of about 0 units to about 40 units of sparkle. For example, the article 100, 100' may have a sparkle contrast in a range of about 0 units, 2 units, 4 units, 6 units, 8 units, or 10 units to about 12 units, 14 units, 16 units, 18 units, 20 units, 22 units, 24 units, 26 units, 28 units, 30 units, 32 units, 34 units, 36 units, or 38 units, or 40 units.

In some embodiments, the article has no sparkle or a sparkle of less than 40 units when in combination with a high-resolution display 210. For example, in some embodiments, when the article is in front of a high-resolution display 210 (optionally having greater than 100 PPI or 150 PPI) such that light passes through the article, the article has no sparkle visible to the human eye or a sparkle of less than 40 units. For example, the article may have a sparkle in a range of about 0 units, 2 units, 4 units, 6 units, 8 units, or 10 units to about 12 units, 14 units, 16 units, 18 units, 20 units, 22 units, 24 units, 26 units, 28 units, 30 units, 32 units, 34 units, 36 units, or 38 units, or 40 units.

The optical properties of an article of the present invention (e.g., article 100, 100') may also be characterized by the transmission of diffused light. The transmission of diffused light may be measured by the "haze" and/or the "clarity" of the article. As used herein, the term "haze" corresponds to the diffuse transmittance at wide angles of scattering and the term "clarity" corresponds to the diffuse transmittance at narrow angles of scattering. In some embodiments, the haze of the article may be in a range of about 5%, 10%, 15%, 20%, 25%, 30%, 35%, 40%, 45%, or 50% to about 55%, 60%, 65%, 70%, 75%, 80%, 85%, 90%, or 95%. In some embodiments, the clarity of the article may be in a range of about 0%, 5%, 10%, 15%, 20%, or 25% to about 30%, 35%, 40%, 45%, 50%, 55%, 60%, 65%, 70%, 75%, or 80%.

Methods of forming surface structures and/or surface roughness on a substrate (e.g., a glass or plastic substrate) known of those skilled in the art may be used. For example, in some embodiments, the process of forming the surface structures 105 and/or surface roughness on the front and back surfaces 102a, 102b of the article 100, 100' may comprise additive (e.g., spray-on), subtractive (e.g., etch), cast molding, mechanical (e.g., sandblasting or laser abrading), or any combination of methods thereof. In some embodiments, the article 100, 100' may have etched surfaces. In some embodiments, the randomly oriented surface structures 105 on the front surface 102a and/or back surface 102b of the article 100, 100' may be formed by chemical etching. In some embodiments, the surface structures 105 on the front surface 102a and/or back surface 102b of the article 100, 100' may be micro-etched.

The production method for producing surface structures on a substrate as described herein may vary, but may include treating the front and back surfaces of the substrate to achieve a different surface roughness and/or gloss value on the front surface compared to the back surface. The surface roughness and/or gloss value for the front and back surfaces may achieve a desired sparkle reduction for a display system stack of the present invention.

In a wet chemical etch, additive spray, or dip anti-glare treatment this may involve masking the front or back surface 102a, 102b of the substrate 102, 102', processing the unmasked surface to a desired roughness, then masking the already roughened surface and processing the other surface to a different roughness.

For a mechanical etch, this may involve micromachining, laser ablating, or sandblasting each surface 102a, 102b to a desired roughness, such as, for example, by either processing it twice with each pass creating the difference in roughness on each surface 102a, 102b, or by simultaneously processing both surfaces 102a, 102b to a different roughness. In some embodiments, this may be achieved with a substrate 102' including two-single side roughened layers 104, 106 with a difference in roughness optically bonded to produce an article 100' with the roughened surfaces 102a', 102b' on the outside of the article 100'. In some embodiments, substrates 102, 102' can be casted, e.g., using a mold with a different roughened pattern for each surface 102a, 102b, and casting the substrate 102, 102'.

In some embodiments, an anti-glare article of the present invention is provided that comprises a substrate (e.g., a transparent substrate) having an index of refraction of about 1.4 to about 1.8 with a different roughness on the front and back surfaces. The anti-glare article may maintain anti-glare properties and reduce sparkle when used as a cover glass in front of a display 210. The article may be bonded to the display 210 with a material 230 of a different index of refraction or there may be an air gap 220 between the article and the display 210.

The present invention will now be described with reference to the following EXAMPLES. It should be appreciated that these examples are for the purposes of illustrating aspects of the present invention, and do not limit the scope of the invention as defined by the claims provided herein.

EXAMPLES

The following EXAMPLES provide illustrative embodiments. Certain aspects of the following EXAMPLES are disclosed in terms of techniques and procedures found or contemplated by the present inventors to work well in the practice of the embodiments. In light of the present disclosure and the general level of skill in the art, those of skill will appreciate that the following EXAMPLES are intended to be exemplary only and that numerous changes, modifications, and alterations can be employed without departing from the scope of the presently claimed subject matter.

Example 1

Four samples comprising soda lime glass were tested: (1) "normal double side" had approximately the same roughness on the front and back surfaces; (2) "normal single side" was roughened on one surface; (3) "new(1)" had a 70 gloss front surface and a 35 gloss rear surface (rougher on the rear surface) and "new(2)" had approximately 70 gloss on the front surface and approximately 1.5 gloss on the rear surface (rougher on the rear surface); and (4) "new(3)" was a two layer substrate: a "normal single side" layer bonded to a "new(2)" layer. A wet etch dipping process was used to create the roughened surfaces by processing the unmasked surface to a desired roughness, then masking the already roughened surface and processing the other surface to a different roughness.

Profilometry Measurement Method: The surface roughness values of the samples were measured using a Stylus Profilometer Mitutoyo SJ-410 (Mitutoyo America Corp.) in accordance with standard EN ISO 4287-1997. The roughness of a surface is measured by an instrument in which a stylus travels across the surface of a substrate. The movement of the stylus is amplified and the signal is recorded. Stylus: 5 µm tip radius at 90° angle, Force: −4 mN, Filter: Guassian, $\lambda c$: 0.8 mm, $\lambda s$: 2.5 mm, Evaluation Length (L): 4 mm, Speed: 0.5 mm/s.

The sparkle contrast of the sample was measured by an SMS-1000 instrument using the Sparkle Difference Method in accordance with the system's manufacturer, Display Messtechnik & Systeme (Neckar, Germany).

Sparkle Measurement: For evaluation of the level of sparkle the intensity modulations caused by the pixel matrix of the display (regular modulations) have to be separated from the random intensity modulations that are perceived as sparkle. The sample is applied to a display screen with a specific pitch of the pixel matrix and an image of that combination is taken with the camera of the SMS-1000. During the measurement of sparkle usually only the green subpixels of the display are activated because under that condition the human eye is very sensitive with respect to detection of small features. Exposure is set on the SMS-1000 instrument without the sample and placed at the highest setting without over exposing the image. The pixel ratio (ratio of pixels on the target to camera pixels) is set and the reference is set to 0. The sample is placed over the target and the first data point is captured. The sample is again placed over the target and the second data point is captured. The recorded image is numerically low-pass filtered to account for the limited angular resolution of the human eye and to separate the display pixel modulation from the sparkle. The level of sparkle is evaluated as the standard deviation of the gray-level distribution of the filtered image divided by the mean value (similar to the speckle contrast). Distance: 1.5 mm, Target: 324 PPI.

Distinctness of Image (DOI) Measurement Method: Scattering of light by micro-structured surfaces does not only reduce specular reflections, it also affects the distinctness (e.g., clarity) of images shown on the display screen. The distinctness of image (DOI) can be measured using the same SMS-1000 instrument. Exposure is set on the instrument without the sample and placed at the highest setting without over exposing the image. A reference measurement ("ref") is taken. The sample is then placed on the spacer with the rear surface 1.5 mm away from the 324 PPI target and a sample measurement is taken. The DOI is calculated as the sample measurement divided by the reference measurement:

$$\left(\frac{DOI@\delta}{ref} = \text{Actual, where } \delta = 1.5, 0, \text{Bonded Water}\right)$$

Water bonded means the glass was optically bonded or interfaced to the measurement target using water which has an index of refraction of 1.333 opposed the case of the 0 mm and 1.5 mm where the rear surface of the article was simply against the target (0 mm) and 1.5 mm off of the target with air as the interface. Distance: 1.5 mm, Target: 324 PPI.

Transparency ("trail"), haze, and clarity were measured with a BYK Haze Gard Plus 4725 instrument (BYK-Chemie GmbH) and the results are in percentages.

The results of the above measurements are in Table 1.

Table 2 shows ranges of roughness (Ra) and distinctness of image (DOI) based on single surface etched gloss values.

for the testing shows 100% agreement that Sample 1 has higher sparkle than Sample 2 (see, e.g., Table 3) and that in both cases, when there is a difference of the index refraction ($\Delta n$), sparkle was reduced (Tale 4). Considering that the glass used in the substrate has an index of refraction (n) of 1.52 and that $\Delta n$ for the substrate with mineral oil is 0.04

TABLE 1

|  | Thickness | Front (Gloss Designation) | Rear (Gloss Designation) | Gloss (Measured) | Tran | Haze | Clarity | Ref |
|---|---|---|---|---|---|---|---|---|
| Normal Double Side | 1.9 | 70 | 70 | 60 | 92.8 | 10.81 | 70.7 | 0.766 |
| Normal Single Side | 1.9 | 70 | N/A | 62.7 | 92.4 | 7.88 | 74.9 | 0.766 |
| New(1) | 1.9 | 70 | 35 | 46.5 | 92.6 | 24.2 | 51.2 | 0.766 |
| New(2) | 1.9 | 70 | 1.5 | 54.6 | 83 | 96.9 | 5.2 | 0.766 |
| New(3) | N/A | N/A | N/A | 41 | 91 | 26.9 | 39.9 | 0.816 |

|  | DOI @ 1.5 mm | DOI actual @ 1.5 mm | Ref | DOI @ 0 mm | DOI actual @ 0 mm | Ref | DOI Bonded Water | DOI Actual Water Bonded B |
|---|---|---|---|---|---|---|---|---|
| Normal Double Side | 0.188 | 0.245430809 | 0.753 | 0.241 | 0.320053121 | 0.758 | 0.316 | 0.416886544 |
| Normal Single Side | 0.217 | 0.283289817 | 0.753 | 0.22 | 0.292164675 | 0.758 | 0.192 | 0.253298153 |
| New(1) | 0.081 | 0.105744125 | 0.753 | 0.094 | 0.124833997 | 0.758 | 0.327 | 0.431398417 |
| New(2) | 0.001 | 0.001305483 | 0.753 | 0.002 | 0.002656042 | 0.758 | 0.012 | 0.015831135 |
| New(3) | 0.027 | 0.033088235 | 0.784 | 0.027 | 0.034438776 | 0.784 | 0.099 | 0.12627551 |

|  | Front Ra | Rz | Rq | Rear Ra | Rz | Rq | Sparkle @ 1.5 mm | Sparkle @ 0 mm | SprkH20bond |
|---|---|---|---|---|---|---|---|---|---|
| Normal Double Side | 0.1 | 0.7 | 0.12 | 0.1 | 0.7 | 0.12 | 12.941 | 21.672 | 23.116 |
| Normal Single Side | 0.14 | 1 | 0.18 | 0.03 | 0.03 | 0.03 | 11.863 | 19.832 | 22.64 |
| New(1) | 0.09 | 0.7 | 0.11 | 0.15 | 1.1 | 0.18 | 8.559 | 18.502 | 21.165 |
| New(2) | 0.1 | 0.7 | 0.12 | 0.39 | 2.6 | 0.48 | 2.946 | 3.238 | 9.625 |
| New(3) | NA | N/A | N/A | N/A | N/A | N/A | 5.987 | 8.512 | 16.382 |

TABLE 2

| Gloss | Ra Min | Max | DOI Min | Max |
|---|---|---|---|---|
| <10 | 0.3 | 0.7 | 0 | 0.105 |
| <30 | 0.2 | 0.3 | 0.02 | 0.1 |
| <40 | 0.175 | 0.25 | 0.04 | 0.15 |
| <60 | 0.125 | 0.2 | 0.08 | 0.45 |
| <80 | 0.075 | 0.15 | 0.2 | 0.6 |
| <100 | 0.05 | 0.125 | 0.35 | 0.7 |
| >100 | 0.03 | 0.11 | 0.4 | 0.8 |

Example 2

Two different pieces of etched glass were reviewed for sparkle by ten (10) observers experienced in the display industry and graded "high" for high sparkle (Sample 1) and "low" for low sparkle (Sample 2) using a 189 DPI display with a green screen for a background. The front surface of Sample 1 had a gloss value of 119 and a roughness (Ra) of 0.207 μm and a clear back surface. The font surface of Sample 2 had a gloss value of 103 and a roughness (Ra) of 0.166 μm and a clear back surface. The samples were then placed on a 1.1 mm single-side frosted piece of glass with a back surface having roughness (Ra) of 0.540 μm and a clear front surface. The clear surfaces were bonded with mineral oil (n=1.48), to provide Samples 1A and 2A, respectively, and silicon oil (n=1.4), to provide Samples 1B and 2B, respectively, and compared against themselves. The data (1.52-1.48), which is negligible, the difference of the index of refraction for the substrate with silicon oil, which is 0.12 (1.52-1.40), is and has been observed to be significant. See, e.g., Table 4 (Samples 1A and 2A observed a higher sparkle than Samples 1B and 2B).

TABLE 3

| Observer | Sample 1 | Sample 2 |
|---|---|---|
| 1 | Higher | Lower |
| 2 | Higher | Lower |
| 3 | Higher | Lower |
| 4 | Higher | Lower |
| 5 | Higher | Lower |
| 6 | Higher | Lower |
| 7 | Higher | Lower |
| 8 | Higher | Lower |
| 9 | Higher | Lower |
| 10 | Higher | Lower |

TABLE 4

| Observer | Sample 1A (bonded with mineral oil) | Sample 1B (bonded with silicon oil) | Sample 2A (bonded with mineral oil) | Sample 2B (bonded with silicon oil) |
|---|---|---|---|---|
| 1 | Higher | Lower | Higher | Lower |
| 2 | Higher | Lower | Higher | Lower |
| 3 | Higher | Lower | Higher | Lower |
| 4 | Higher | Lower | Higher | Lower |

TABLE 4-continued

| Observer | Sample 1A (bonded with mineral oil) | Sample 1B (bonded with silicon oil) | Sample 2A (bonded with mineral oil) | Sample 2B (bonded with silicon oil) |
| --- | --- | --- | --- | --- |
| 5 | Higher | Lower | Higher | Lower |
| 6 | Higher | Lower | Higher | Lower |
| 7 | Higher | Lower | Higher | Lower |
| 8 | Higher | Lower | Higher | Lower |
| 9 | Higher | Lower | Higher | Lower |
| 10 | Higher | Lower | Higher | Lower |

In order to set a basis for measurement, these same sample lites of glass were tested lasing two different commercially available measurement techniques for sparkle: Display-Messtechnik & Systeme SMS-1000 (FIG. 10) and Radiant Vision Systems, LLC camera based system (FIG. 11). Radiant Vision Systems, LLC has a camera based system that uses their true test software based on the parameters described in their white paper entitled "Methods for Measuring Display Defects and Mura as Correlated to Human Visual Perception" dated Apr. 19, 2018, which is incorporated herein by reference in its entirety. The Radiant Vision Systems, LLC technology for measuring sparkle (e.g., a form of mura), utilizes the Standard Spatial Observer (SSO) developed by NASA described in U.S. Pat. Nos. 8,139,892 and 7,783,130, which are incorporated herein by reference in their entirety. The samples were compared using mineral oil, index of refraction (n)=1.48, and silicon oil (n=1.4), on each system.

Figure 10:
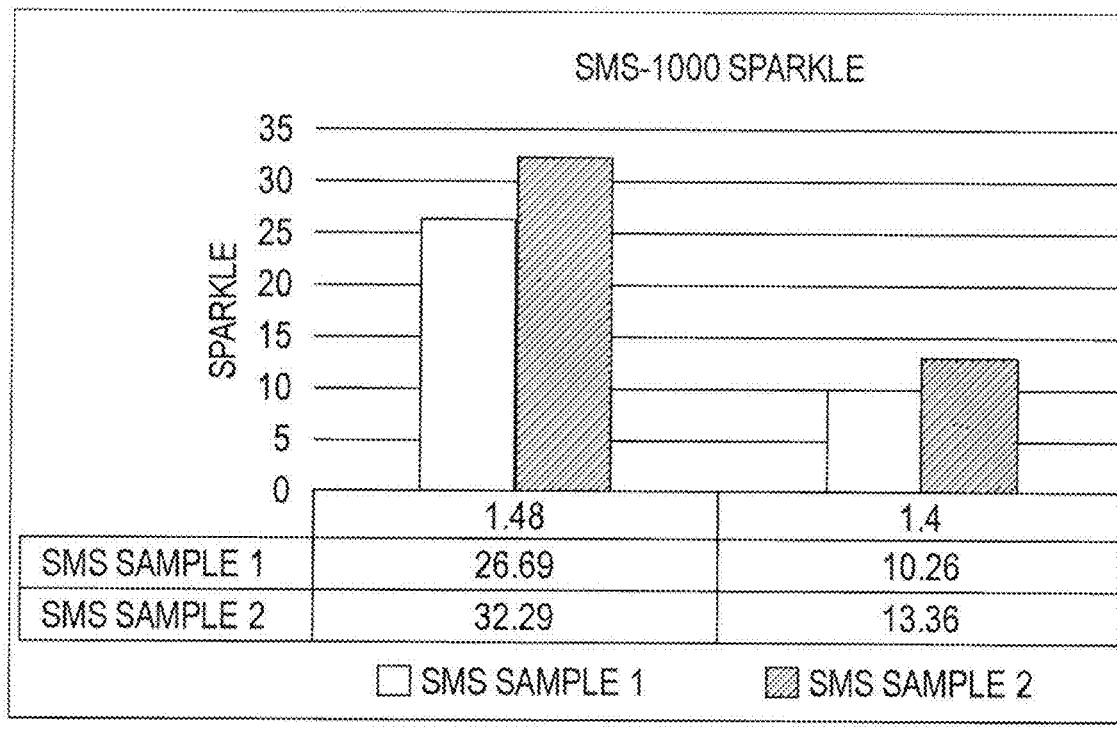
FIG. 10 is a chart comparing the sparkle of samples according to embodiments of the present invention bonded with mineral oil, index of refraction (n)=1.48, and silicon oil (n=1.4) tested using the Display-Messtechnik & Systeme SMS-1000.
Figure 11:
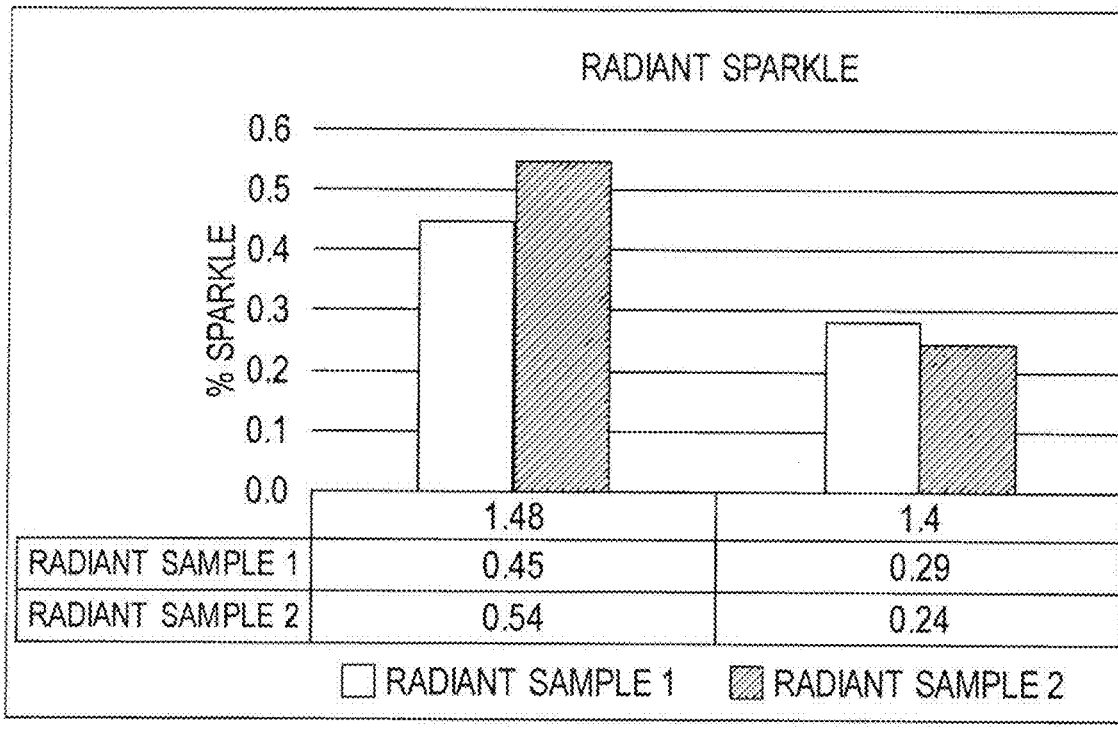
FIG. 11 is a chart comparing the sparkle of samples according to embodiments of the present invention bonded with mineral oil (n=1.48), and silicon oil (n=1.4) tested using the Radiant Vision Systems Camera based system.

As shown in FIG. 10 and FIG. 11, both systems show agreement in the reduction of sparkle with the change in index of the material from matching at n=1.48 to a reduction when n for the bonding material is 1.4. The average reduction for Sample 1 between both instruments was 49% with a difference of 25% between the instruments. The average reduction for the samples between both instruments was 57% with a difference of 3% between the instruments. Additionally, both instruments show 100% agreement of the observations (Table 3).

Example 3

Samples of albatross glass each having a thickness of 0.55 mm, 1.1 mm, or 2.222 mm were bonded to a display using water (n=1.33), silicon oil (n=1.4), or mineral oil (n=1.48). See, e.g., FIG. 4. The front side of each sample had a 70 or 110 single-side gloss. To provide Samples A-F as described in Table 5. Each of the substrates was tested for sparkle and DOI using Radiant Vision Systems, LLC's camera based system as described herein and then compared.

TABLE 5

| Sample | Thickness | Front Gloss | Front Roughness Ra (μm) | Back Gloss | Back Roughness Ra (μm) |
| --- | --- | --- | --- | --- | --- |
| A | 0.55 | 70 | 0.102 | 2.3 | 0.459 |
| B | 1.1 | 70 | 0.086 | 2.5 | 0.610 |
| C | 2.2 | 70 | 0.063 | 2.4 | 0.412 |
| D | 0.55 | 110 | 0.048 | 2.6 | 0.460 |
| E | 1.1 | 110 | 0.051 | 2.4 | 0.536 |
| F | 2.2 | 110 | 0.049 | 2.3 | 0.475 |

Figure 12:
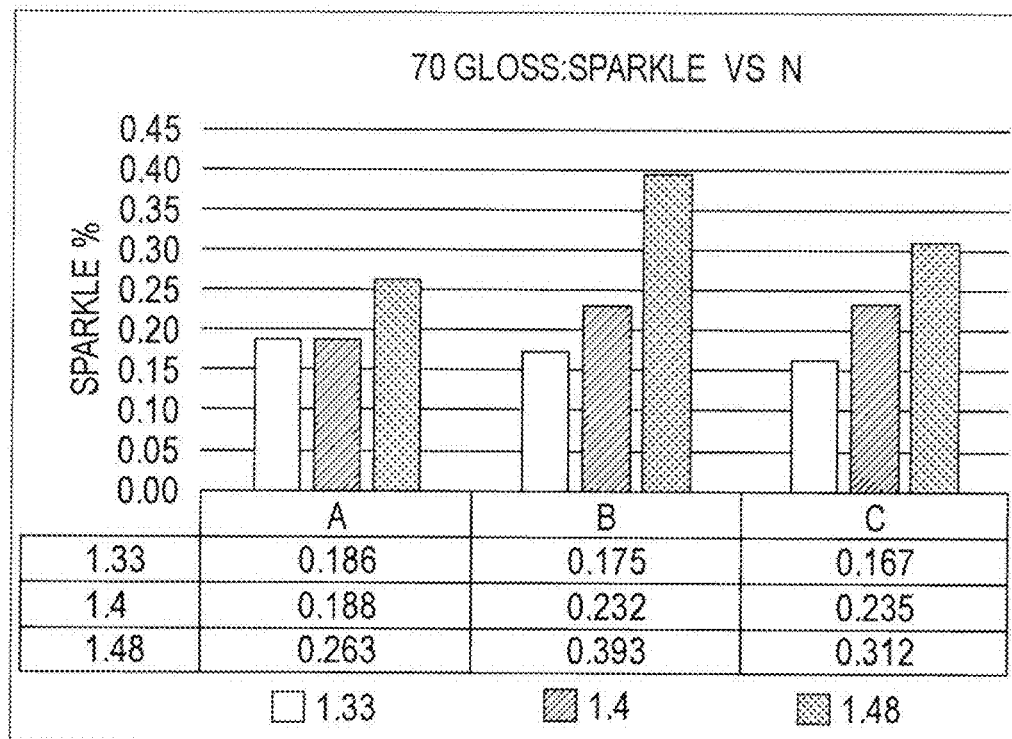
FIG. 12 is at chart comparing the sparkle percentage of samples with a gloss value of 70 bonded together using water (n=1.33), silicon oil (n=1.4), and mineral oil (n=1.48) according to embodiments of the present invention.
Figure 13:
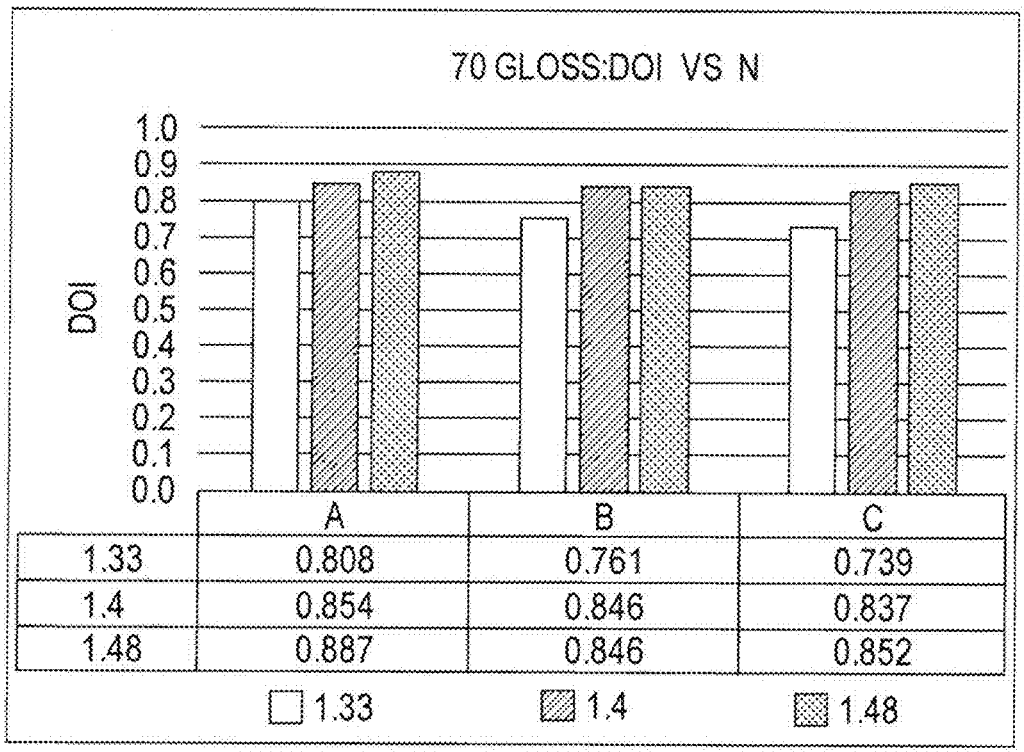
FIG. 13 is a chart comparing the distinctness of image (DOI) of samples with a gloss value of 70 bonded together using water (n=1.33), silicon oil (n=1.4), and mineral oil (n=1.48) according to embodiments of the present invention.
Figure 14:
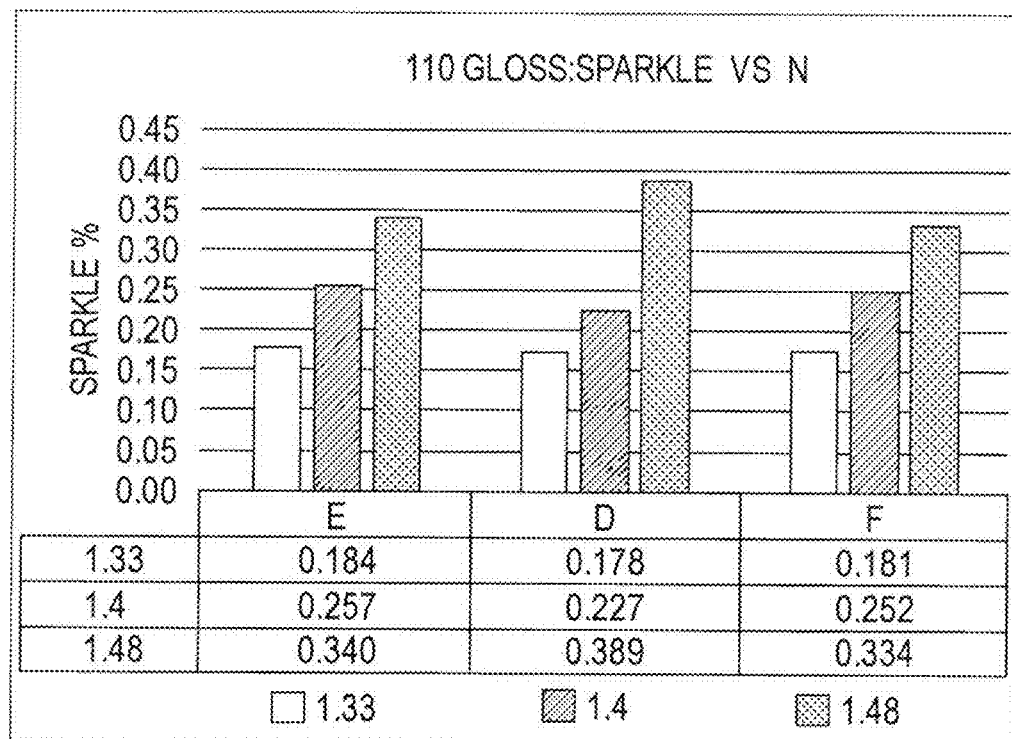
FIG. 14 is a chart comparing the sparkle percentage of samples with a gloss value of 110 bonded together using water (n=1.33), silicon oil (n=1.4), and mineral oil (n=1.48) according to embodiments of the present invention.
Figure 15:
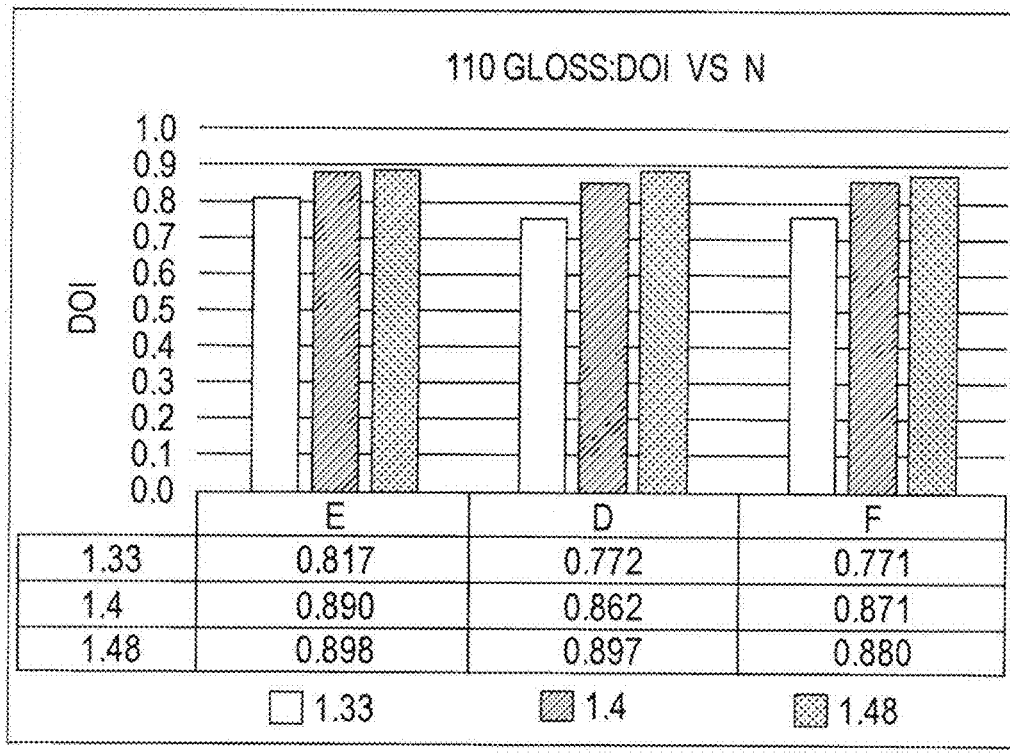
FIG. 15 is a chart comparing the distinctness of image (DOI) of samples with a gloss value of 110 bonded together using water (n=1.33), silicon oil (n=1.4), and mineral oil (n=1.48) according to embodiments of the present invention.
Figure 16:
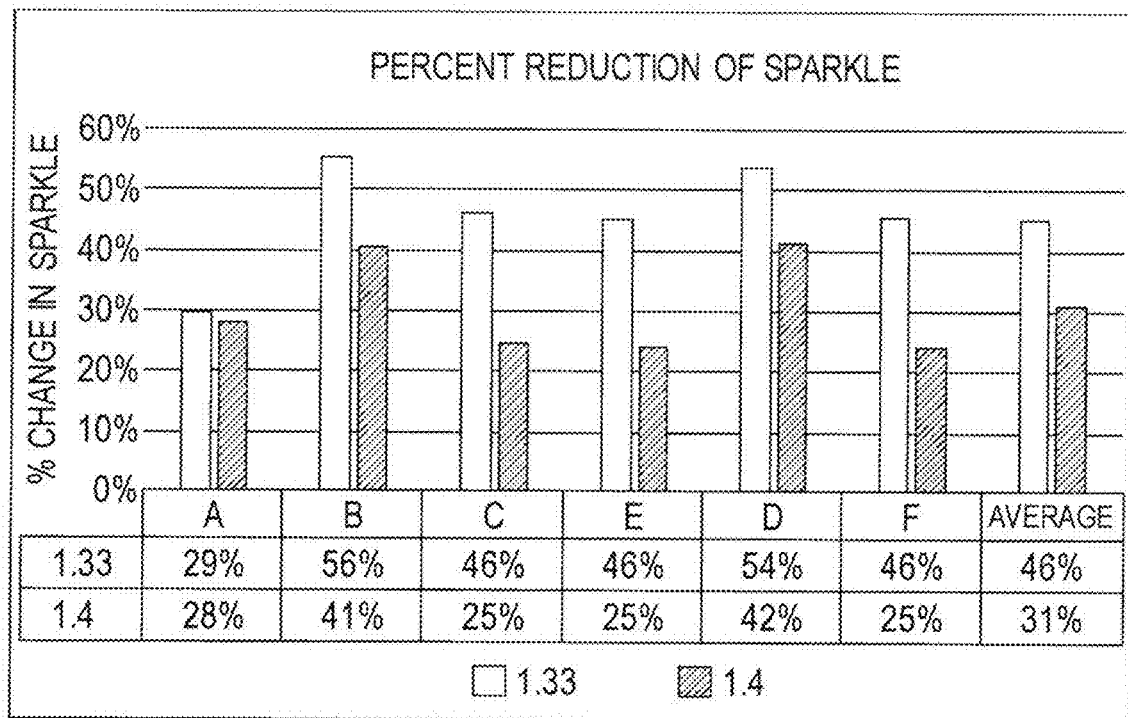
FIG. 16 is a chart comparing the percent reduction of sparkle of samples bonded together using water (n=1.33) and silicon oil (n=1.4) according to embodiments of the present invention.
Figure 17:
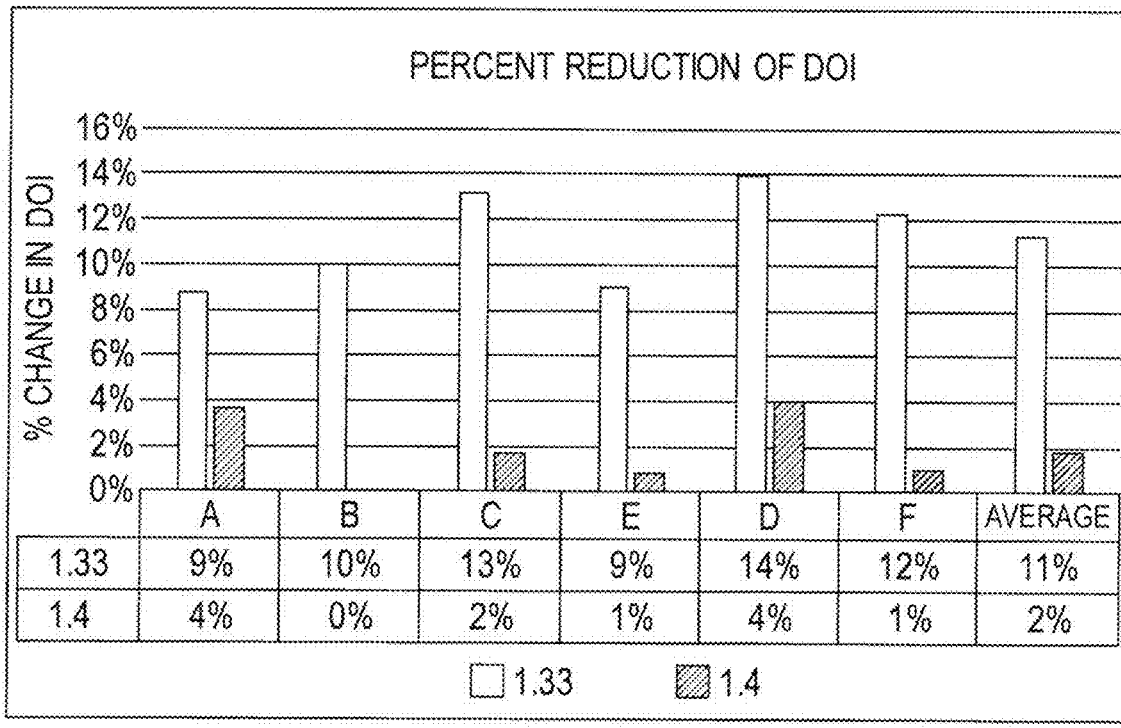
FIG. 17 is a chart comparing the percent reduction of DOI of samples bonded together using water (n=1.33) and silicon oil (n=1.4) according to embodiments of the present invention.

The samples show that with the change in refractive index (n) the sparkle is reduced. See, e.g., FIG. 12 and FIG. 14. This holds true for various gloss levels with different surface roughness. See, e.g., FIG. 13 and FIG. 15. The data shows that with a relatively large change of n, there is a minimal impact on DOI. FIG. 16 and FIG. 17 show the percent reduction in sparkle and DOI relative to the index matched (n=1.48) material versus n=1.4 and n=1.33. This makes evident that as the index for the bonding material moves further away from matching the glass, for which n=1.52, the sparkle reduction increases as does the DOI. On average, with a difference in n of 0.08 (1.48-1.40), the average sparkle reduction for the 70 and 100 gloss samples is 31% with a 2% reduction in DOI. With a difference in n of 0.15 (1.48-1.33), the sparkle reduction increases to 46%, and the DOI reduction increases to 11%.

Example 4

Three (3) tablets using three (3) different pixel densities where tested: 189 pixels per inch (PPI) (Tablet Sample A), 224 PPI (Tablet Sample B), and 264 PPI (Tablet Sample C). Each substrate was constructed using the same piece of glass with roughened front and rear surfaces per embodiments of the present invention detailed in Table 6. Half of the panel was bonded using Optical Filters VB2-FLS UV cured optical adhesive with a refractive index (n) of 1.48 and the other half of the panel was bonded using Norland Products NOA 1625 UV cured optical adhesive with n=1.625. In all cases, the front glass was bonded to the LCD by Optical Filters.

Figure 18:
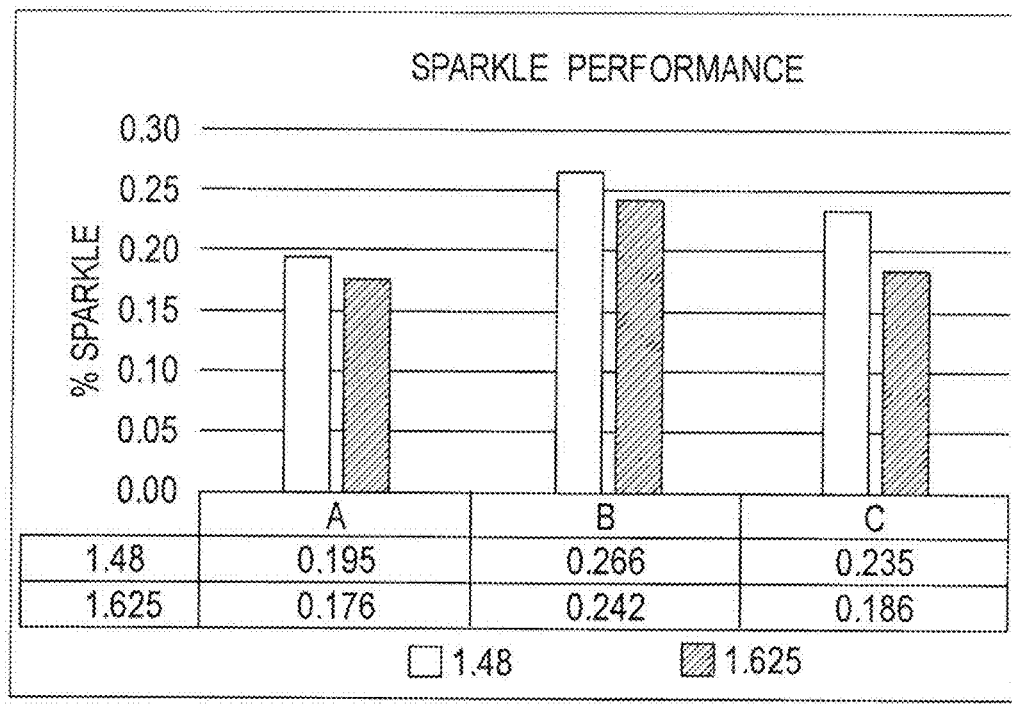
FIG. 18 is a chart comparing the sparkle performance of three tablets having three different pixel densities: (A) 189 pixels per inch (PPI), (B) 224 PPI, and (C) 264 PPI, each bonded together with different optical adhesives having indexes of refraction of 1.48 and 1.625 according to embodiments of the present invention.
Figure 19:
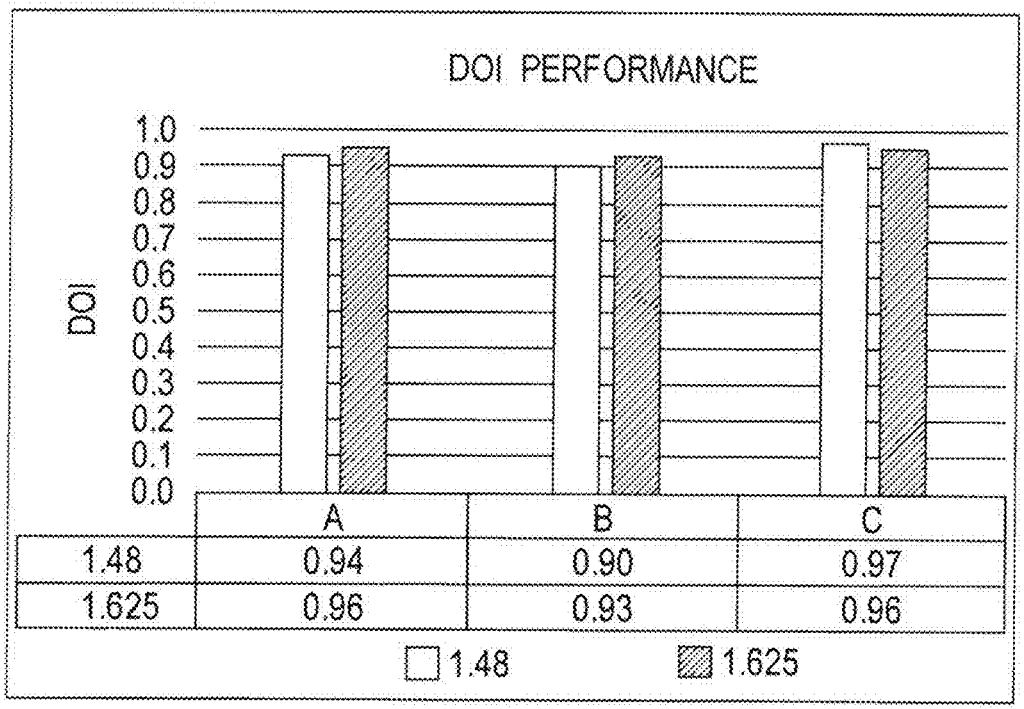
FIG. 19 is a chart comparing the DOI performance of three tablets having three different pixel densities: (A) 189 pixels per inch (PPI), (B) 224 PPI, and (C) 264 PPI, each bonded together with different optical adhesives having indexes of refraction of 1.48 and 1.625 according to embodiments of the present invention.

Those of skill in the art of bonding consider n=1.48 sufficiently close enough to glass (n=1.52) to minimize refraction between substrates such that it is considered index matched, and consider n=1.625 to be sufficiently different from the glass (n=1.52) to be considered index mismatched. The half with a refractive index of 1.48 eliminated diffraction from the roughened surface and the half with a refractive index of 1.625 allowed enough difference for the roughened surface to affect sparkle. The bonding material was approximately 0.75 nm thick between the front of the LCD display and the invention. Table 6 indicates the general build for each sample optically bonded to a display and FIGS. 18 and 19 show the results from measurements for n=1.48 and n=1.625. Measurements were taken using Radiant Vision Systems, LLC's camera based system and True test software for analysis as described herein.

TABLE 6

| Tablet Sample | Front Gloss | Front Roughness Ra (μm) | Back Gloss | Back Roughness Ra (μm) | Thickness (mm) |
| --- | --- | --- | --- | --- | --- |
| A | 70 | 0.102 | 2.6 | 0.561 | 1.10 |
| B | 110 | 0.060 | 2.3 | 0.580 | 1.10 |
| C | 70 | 0.111 | 2.5 | 0.542 | 0.55 |

As observed from FIG. 18 and FIG. 19, sparkle was reduced with a minimum impact on DOI (resolution). Tablet Samples A, B and C show reductions of sparkle of 10%, 9% and 21%, respectively, with a loss of resolution of 2%, 3% and 2%, respectively, in a manufactured display system. In all examples of the present invention, sparkle reduction has been achieved with a Δn greater than glass (Norland Products NOA 1652, n=1.625) and with silicon of (n=1.4). Those familiar with bonding materials know there are several commercially available materials with 1.39<n<1.625.

Example 5

Figure 20:
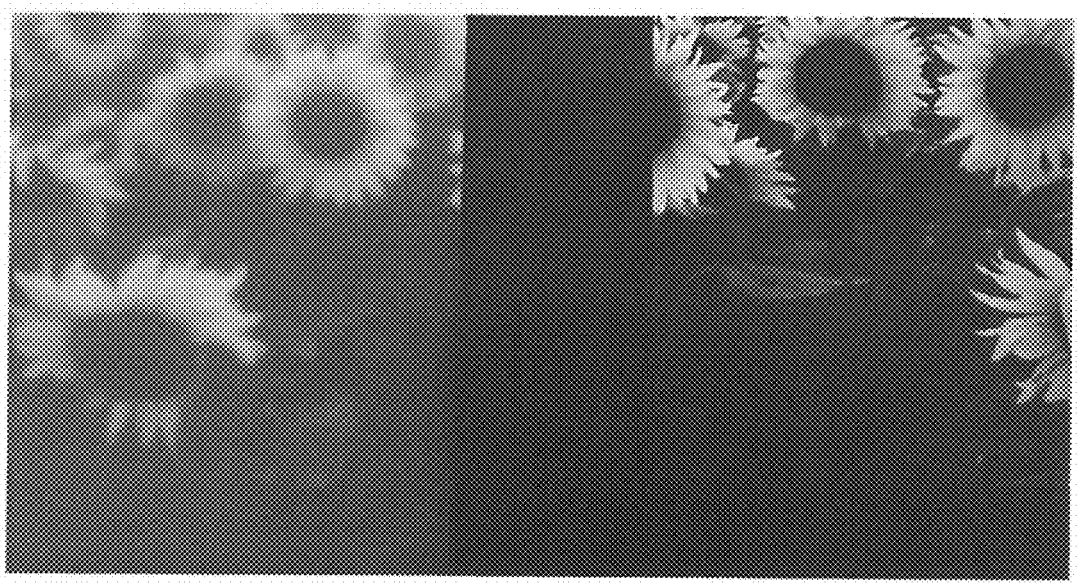
FIG. 20 is a photograph showing the visual effect of an exemplary article according to embodiments of the present invention. The background image is a 189 PPI display providing an image of sunflowers. Albatross glass with 110 gloss, 0.060 µm Ra front surface, 2.3 gloss, 0.532 µm Ra back surface. Left side of image: air gapped (n=1), right side of image: water bonded (n=1.33).
Figure 21:
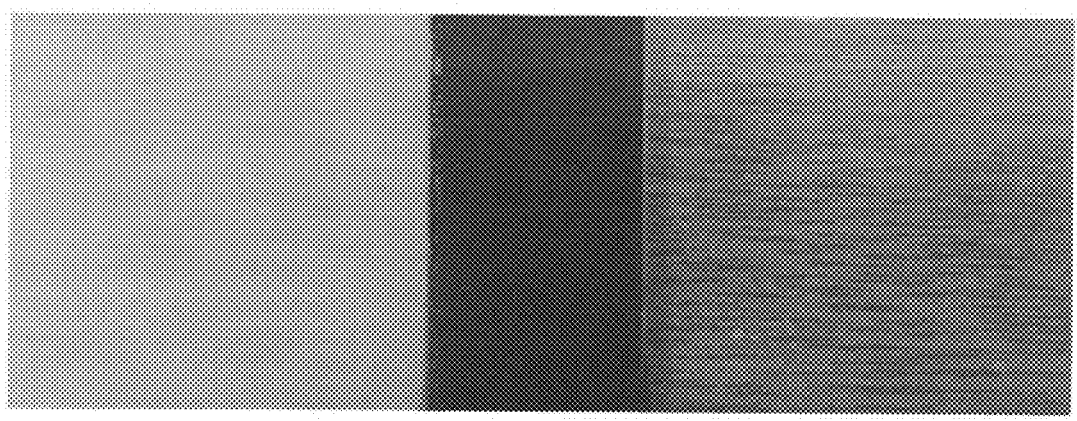
FIG. 21 is a photograph showing the visual effect of an exemplary article according to embodiments of the present invention. The background image is an office desk. Albatross glass with 110 gloss, 0.060 µm Ra front surface, 2.3 gloss, 0.532 µm Ra back surface. Left side of image; air gapped (n=1), right side of image: water bonded (n=1.33) to 0.4 mm clear glass.
Figure 22:
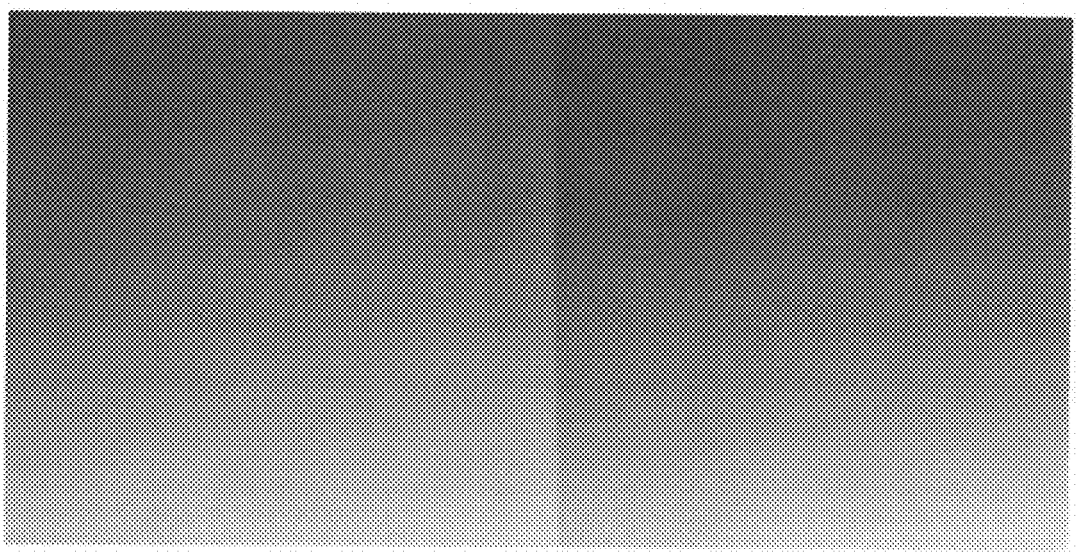
FIG. 22 is a photograph showing the visual effect of an exemplary article according to embodiments of the present invention. The background image is the 189 PPI display in the off state. Albatross glass with 110 gloss, 0.060 µm Ra front surface, 2.3 gloss, 0.532 µm Ra back surface. Left side of image: air gapped (n=1) right side of image: water bonded (n=1.33).

Albatross glass with 110 gloss, 0.060 μm Ra front surface, 2.3 gloss, and 0.532 μm Ra back surface was provided over different backgrounds and photographs were taken. FIGS. 20-22 are photographs of the glass over different backgrounds. In FIGS. 20 and 22, the left side of the image is the glass with an air gap (n=1) over the background and the right side of the image was water bonded (n=1.33) to the background. In FIG. 21, the left side of the image is the glass with an air gap (n=1) over the background and the right side of the image was, water bonded (n=1.33) to 0.4 mm clear glass. Accordingly, the difference in visual effects for an air gap compared to water bonding over different backgrounds can be compared.

The background image in FIG. 20 is a 189 PPI display showing a sunflower. The background image in FIG. 21 is an office desk. The background image in FIG. 22 is a 189 PPI display in the off state.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An article comprising a substrate including opposed front and back surfaces,
    wherein the front surface and the back surface each comprise surface structures that are randomly oriented on each surface,
    wherein the front surface and the back surface each have a surface roughness and a gloss value, and
    wherein the surface roughness of the front surface does not equal the surface roughness of the back surface and/or the gloss value of the front surface does not equal the gloss value of the back surface.

2. The article of claim 1, wherein the substrate consists of a single unitary layer.

3. The article of claim 1, wherein the substrate comprises a first layer and a second layer that are stacked, wherein the first layer comprises the front surface and the second layer comprises the back surface.

4. The article of claim 3, wherein the second layer comprises the front and back surfaces or the first layer comprises the front and back surfaces.

5. The article of claim 1, wherein the surface roughness of the front surface does not equal the surface roughness of the back surface.

6. The article of claim 1, wherein the gloss value of the front surface does not equal the gloss value of the back surface.

7. The article of claim 1, wherein the surface roughness for the front surface and/or the back surface is in a range of about 0.01 microns to about 1 micron, optionally as measured pursuant to standard EN ISO 4287-1997, Amendment 1 version, dated 15 Jun. 2009.

8. The article of claim 1, wherein the front surface and/or the back surface have a gloss value, when measured at 60 degrees, in a range of about 1.5 gloss units (OU) to about 140 GU, optionally as measured pursuant to standard ASTM D523-14, reapproved 2018.

9. The article of claim 1, wherein the surface roughness of the back surface is greater than the surface roughness of the front surface (i.e., the back surface is rougher than the front surface) in a ratio of about 1.3:1 to about 15:1.

10. The article of claim 1, wherein the article has greater than 4 peaks per 100 microns and/or a sparkle contrast in a range of about 0 to about 40 units of sparkle.

11. The article of claim 1, wherein the article has no sparkle visible to the human eye or a sparkle of less than 40 units, optionally as measured by an SMS-1000 instrument, when in combination with a high-resolution display optionally having greater than 100 pixels per inch.

12. The article of claim 1, wherein the surface roughness of the back surface and/or the front surface of the article is less than 1 μm and the max peak to valley is less than 4 μm.

13. The article of claim 1, wherein the article is an anti-glare etched article.

14. The article of claim 1, wherein the article uniformly disperses light.

15. The article of claim 1, wherein the surface structures on the front surface and/or the back surface of the article are formed by a process comprising additive, subtractive, cast molding, and/or mechanical methods.

16. A display system stack, comprising:
    a display; and
    the article of claim 1,
    wherein the display is configured to emit light through the article.

17. The display system stack of claim 16, further comprising an air gap between a front surface of the display and the article.

18. The display system stack of claim 16, further comprising a bonding material that is between the article and display and bonds the article and display together, optionally wherein the bonding material has a different refractive index than the article.

19. The display system stack of claim 16, wherein the bonding material has a refractive index greater than 1.5.

20. The display system stack of claim 16, wherein the bonding material has a refractive index less than 1.5.

* * * * *